(12) United States Patent
Ebrahimi Afrouzi et al.

(10) Patent No.: US 12,298,780 B1
(45) Date of Patent: *May 13, 2025

(54) METHOD FOR SHARING DATA BETWEEN MOTOR VEHICLES TO AUTOMATE ASPECTS OF DRIVING

(71) Applicants: Ali Ebrahimi Afrouzi, Henderson, NV (US); Soroush Mehrnia, Soeborg (DK)

(72) Inventors: Ali Ebrahimi Afrouzi, Henderson, NV (US); Soroush Mehrnia, Soeborg (DK)

(73) Assignee: AI Incorporated, Toronto (CA)

( * ) Notice: Subject to any disclaimer, the term of this patent is extended or adjusted under 35 U.S.C. 154(b) by 203 days.

This patent is subject to a terminal disclaimer.

(21) Appl. No.: 18/096,422

(22) Filed: Jan. 12, 2023

Related U.S. Application Data

(63) Continuation of application No. 16/402,122, filed on May 2, 2019, now Pat. No. 11,579,631, which is a continuation of application No. 14/948,620, filed on Nov. 23, 2015, now abandoned.

(60) Provisional application No. 62/086,793, filed on Dec. 3, 2014.

(51) Int. Cl.
*G05D 1/00* (2024.01)
*B60W 10/04* (2006.01)
*B60W 10/20* (2006.01)
*B60W 30/165* (2020.01)

(52) U.S. Cl.
CPC ........... *G05D 1/0295* (2013.01); *B60W 10/04* (2013.01); *B60W 10/20* (2013.01); *B60W 30/165* (2013.01); *G05D 1/0088* (2013.01); *B60W 2554/80* (2020.02); *B60W 2556/50* (2020.02); *B60W 2556/65* (2020.02); *B60W 2710/20* (2013.01); *B60W 2720/10* (2013.01)

(58) Field of Classification Search
CPC .. G05D 1/0295; G05D 1/0088; G05D 1/0291; G05D 1/0293; B60W 10/04; B60W 10/20; B60W 30/165; B60W 2554/80; B60W 2556/50; B60W 2556/65; B60W 2710/20; B60W 2720/10; B60W 2550/30; B60W 2420/42; B60W 30/09; B60W 50/14; B60W 30/14; B60W 30/00; B60W 2554/4041; B60W 30/18; B60W 2520/10; B60W 30/143; B60W 30/16; B60W 2050/0088; B60W 2556/45; B60W 2754/30; B60W 2554/804; B60W 50/08; B60W 60/00; B60W 2300/12; G08G 1/22
See application file for complete search history.

(56) References Cited

U.S. PATENT DOCUMENTS

2015/0177007 A1* 6/2015 Su .................. G05D 1/0246
701/25
2017/0227972 A1* 8/2017 Sabau .................. G05D 1/0027

* cited by examiner

*Primary Examiner* — Jelani A Smith
*Assistant Examiner* — Paul A Castro

(57) ABSTRACT

Provided is a navigation system for a leader vehicle leading follower vehicles. The leader vehicle is configured to transmit real-time movement data to follower vehicles. The follower vehicles each include a signal receiver for receiving the data from the leader vehicle and a processor configured to determine a set of active maneuvering instructions for the respective follower vehicle based on at least a portion of the data received from the leader vehicle and actuate the respective follower vehicle to execute the set of active maneuvering instructions.

20 Claims, 4 Drawing Sheets

METHOD FOR SHARING DATA BETWEEN MOTOR VEHICLES TO AUTOMATE ASPECTS OF DRIVING

CROSS-REFERENCE TO RELATED APPLICATIONS

This application is a Continuation of U.S. patent application Ser. No. 16/402,122, filed May 2, 2019, which is a Continuation of U.S. patent application Ser. No. 14/948,620, filed Nov. 23, 2015, which claims the benefit of Provisional Patent Application No. 62/086,793, filed Dec. 3, 2014, each of which is hereby incorporated by reference.

FIELD OF THE DISCLOSURE

The disclosure relates to automatic or semi-automatic navigation and maneuvering of motor vehicles.

BACKGROUND

Currently, various driver assistance systems are available in cars to assist drivers in the operation of vehicles. These systems help drivers with the work required to safely drive from an origin to a destination. Some driver assistance systems, such as adaptive cruise control and lane keeping, are advantageous for assisting the driver with the control and stability of a vehicle, but still require a human to manually command and navigate the vehicle.

Although much effort and research has been put toward autonomous vehicles capable of driving from one location to another without the need for human assistance, a fully automatic vehicle that monitors road conditions, reads signs, and processes and reacts to objects while navigating a route between two points requires extensive technological advancement and has been prohibitively expensive to implement. A need exists for a less costly method to automate some aspects of driving motor vehicles.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method for intelligent navigation of a leader vehicle leading a plurality of follower vehicles, include: transmitting, with a signal emitter disposed on the leader vehicle, at least real-time movement data to the plurality of follower vehicles; receiving, with a receiver disposed on each of the plurality of follower vehicles, data transmitted by the leader vehicle; detecting, with one or more sensors disposed on each of the plurality of follower vehicles, at least one maneuverability condition of the respective follower vehicle; measuring, with a distance measuring sensor disposed on each of the plurality of follower vehicles, a distance from the respective follower vehicle to another vehicle; processing, with a processor disposed on each of the plurality of follower vehicles, a vehicle maneuvering software application having a software instruction or code for controlling a movement or an operation of the respective follower vehicle; determining, with the processor disposed on each of the plurality of follower vehicles, a set of active maneuvering instructions for the respective follower vehicle based on at least a portion of the data received from the leader vehicle; actuating, with the processor disposed on each of the plurality of follower vehicles, the respective follower vehicle to execute the set of active maneuvering instructions; broadcasting, with the signal emitter disposed on the leader vehicle, a signal comprising a route of the leader vehicle and a location of the leader vehicle to potential follower vehicles; and determining, with a processor of a potential follower vehicle, to join a driving group led by the leader vehicle when a predetermined portion of a route of the potential follower vehicle matches the route of the leader vehicle and the potential follower vehicle shares a same final destination as the leader vehicle.

Some aspects include a method for intelligent navigation of a guiding vehicle guiding a plurality of follower vehicles, including: determining, with a processor of the guiding vehicle, at least real-time navigation and maneuvering data for each of the plurality of follower vehicles; transmitting, with a signal emitter of the guiding vehicle, at least real-time navigation and maneuvering data to each of the plurality of follower vehicles;

receiving, with a signal receiver of the respective follower vehicle, the at least real-time navigation and maneuvering data for the respective follower vehicle; adjusting, with a processor of the respective follower vehicle, at least a velocity and a steering position of the respective follower vehicle based on the at least real-time navigation and maneuvering data received; broadcasting, with the signal emitter of the guiding vehicle, a signal comprising a route of the leader vehicle and a location of the leader vehicle to potential follower vehicles; and determining, with a processor of a potential follower vehicle, to join a driving group led by the guiding vehicle when a predetermined portion of a route of the potential follower vehicle matches the route of the guiding vehicle and the potential follower vehicle shares a same final destination as the guiding vehicle.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a method for motor vehicles to share data in order to automate some aspects of the operation (navigation and maneuvering) of motor vehicles. In some embodiments, a leader motor vehicle, also referred to herein as a guiding vehicle, which may be human operated or autonomous, establishes a connection with one or more follower motor vehicles (also referred to herein as vehicles to be guided) that have a common route. In some embodiments, the leader vehicle transmits driving information to the one or more follower vehicles, which use the information to make intelligent driving decisions.

Figure 1:
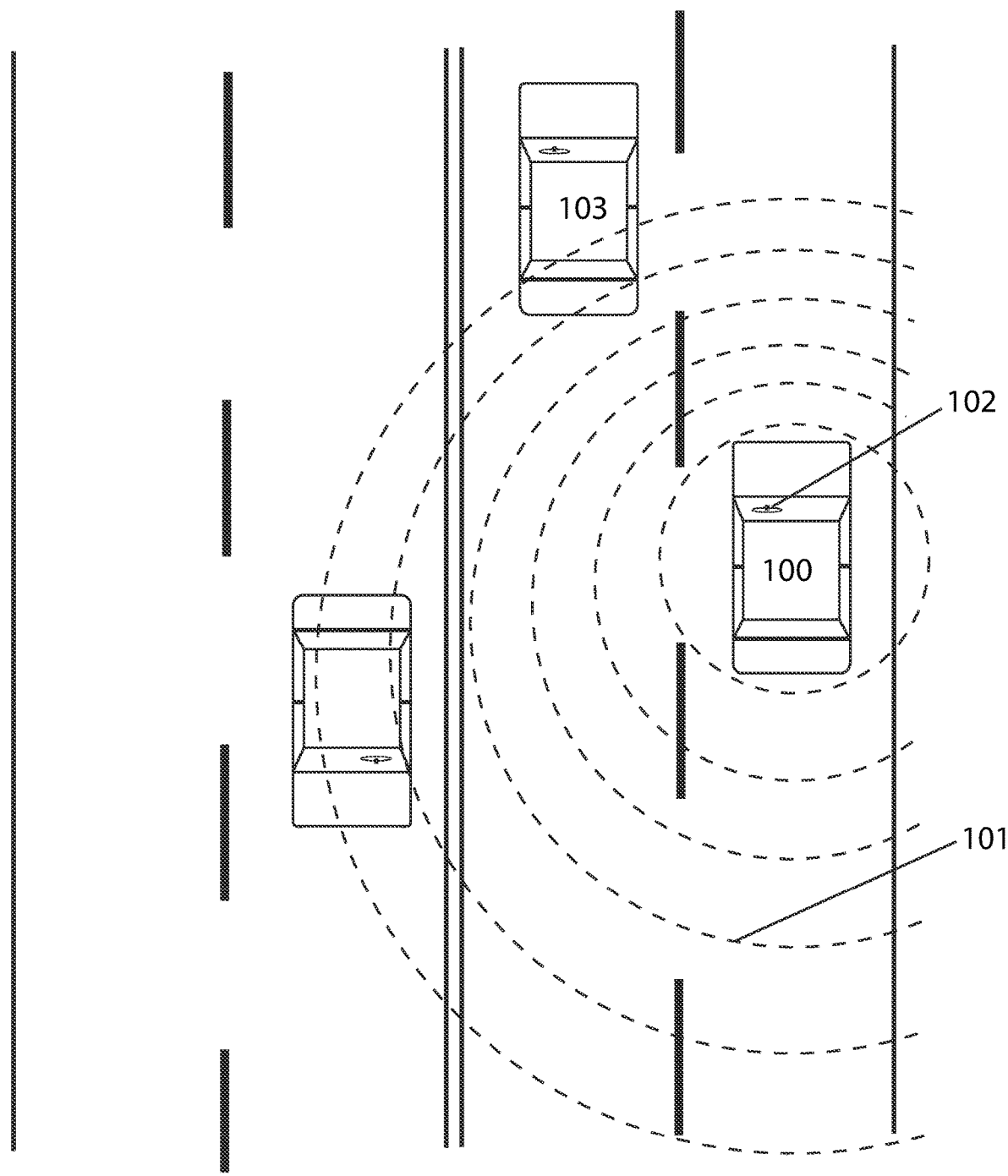
FIG. 1 illustrates an example of a leader vehicle broadcasting a signal indicating its unique identifier, route, and destination, according to some embodiments.

FIG. 1 illustrates an example of a leader-configured motor vehicle. In some embodiments, leader-configured motor vehicles share information with following vehicles to form driving groups wherein following vehicles rely on shared information to make automatic driving decisions. In some embodiments, leader motor vehicles broadcast signals 101 including at least the leader vehicle's destination, a planned route that the leader vehicle will take, and a unique identifier. Signals may be broadcast via an omni-directional antenna 102, for example. In some embodiments, follower-configured vehicles receive and analyze the signal to determine whether they would benefit from joining the driving group. In some embodiments, if a follower vehicle shares the same destination as the leader vehicle, or a common route or partial route, the processor of the follower vehicle determines that the follower vehicle should join the driving group led by the leader vehicle. In FIG. 1, the follower-configured vehicle 103 receives the broadcasted signal 101 from the leader vehicle 100.

Figure 2:
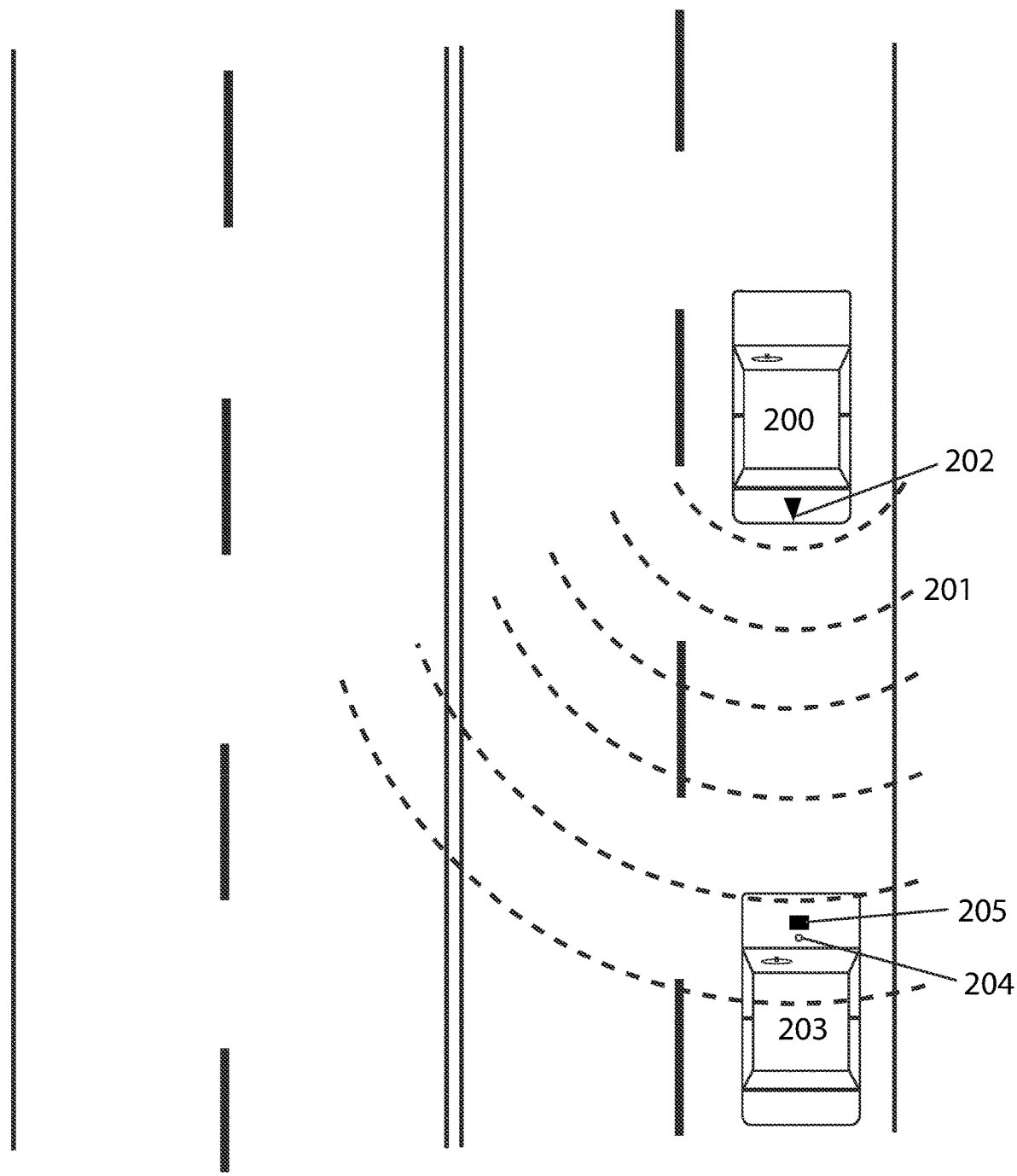
FIG. 2 illustrates an example of the positioning of follower vehicle behind a leader vehicle, according to some embodiments.

In some embodiments, follower vehicles are positioned behind leader vehicles with which they are sharing information. FIG. 2 illustrates an example of the follower vehicle 203 positioned behind a leader vehicle 200. Additional follower vehicles may be positioned one behind another in a line behind the vehicle 203. In some embodiments, signals 201 from a rear-oriented antenna 202 of the leader vehicle 200 are received by a receiver 204 positioned on the follower vehicle. In some embodiments, the follower vehicle is provided with a distance measuring sensor 205 electrically coupled with a processor of the follower vehicle that measures the distance to the vehicle ahead of the local vehicle. A predetermined range of distances may be defined to maintain an ideal distance from the vehicle ahead of the local vehicle. If the distance to the vehicle ahead of the local vehicle is too great, the local vehicle may be caused to accelerate at a predetermined rate until the distance is acceptable. If the distance to the vehicle ahead of the local vehicle is too small, the local vehicle may be caused to decelerate at a predetermined rate until the distance is acceptable.

Once a follower vehicle has joined the driving group of a leader vehicle, the leader vehicle may begin sharing driving information with the follower vehicle. Driving information may include, for example, any of a clock or time synchronizing device, the velocity of the leader vehicle, the steering position of the leader vehicle, rate of acceleration of the leader vehicle, rate deceleration of the leader vehicle, or any other useful information. In some embodiments, driving information may be shared by transmitting data packages from a rear-oriented antenna positioned on the leader vehicle. In embodiments, driving information may be transmitted at predetermined regular intervals and/or anytime any of the driving information metrics have changed. In some embodiments, receipt of driving information from a leader vehicle may activate actuators in a follower vehicle. In some embodiments, upon receipt of a leader vehicle's velocity, a follower vehicle may be caused to match that velocity by automatically accelerating or decelerating. In some embodiments, the increase in velocity of a follower vehicle to match a leader vehicle's velocity may be limited, causing the follower vehicle, in some instances, to extend the amount of time it takes to reach the same velocity as the leader vehicle. In some embodiments, receipt of a steering position of the leader vehicle causes the follower vehicle to match the steering position of the leader vehicle after a calculated delay time. The delay time may be calculated by dividing the distance from the follower vehicle to the leader vehicle by the velocity of the leader vehicle. After the delay time, the follower vehicle adjusts its steering position to match that of the leader vehicle.

In some embodiments, all data packets contain a unique identifier identifying the leader vehicle and its driving group. Data packets may be transmitted between vehicles through any of: radio signals, ultrasonic waves, laser light signals, and infrared light signals, separately or in combination.

Figure 3:
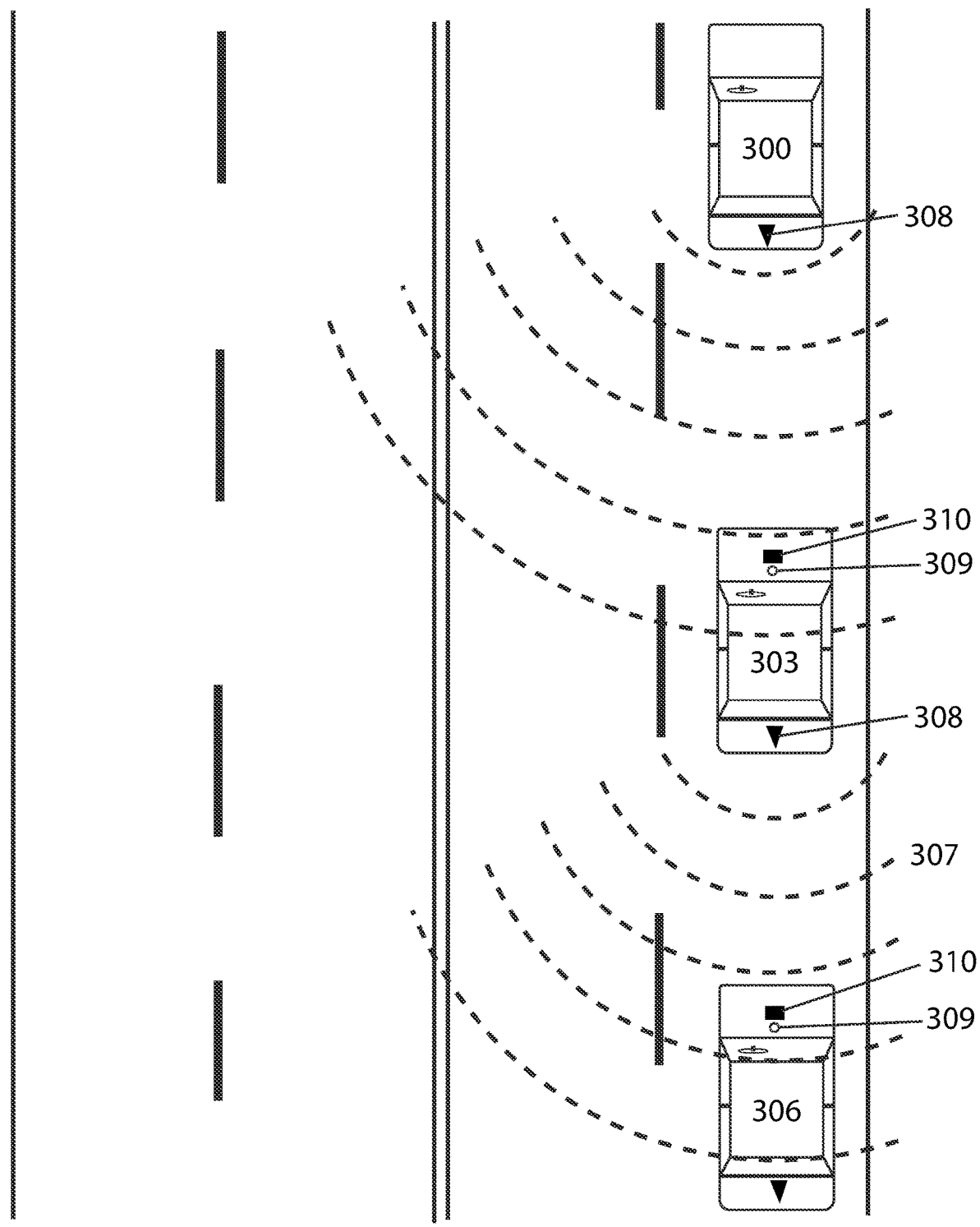
FIG. 3 illustrates an example of a driving group with a plurality of followers, according to some embodiments.

FIG. 3 illustrates an example of a leader vehicle 301 followed by a first follower vehicle 303, then a second follower vehicle 306. In such cases, follower vehicles relay and transmit signals 307 to other follower vehicles through rear-oriented antennas 308. Follower vehicles receive data from other follower vehicles in the same way that data may be received from a leader vehicle: through a receiver 309. In a like manner, follower vehicles may use distance measuring sensors 310 to determine their distance to another follower vehicle, the processor using this information in the same way as previously to maintain an appropriate distance from the vehicle ahead of the local vehicle. In some embodiments, when a first follower vehicle is succeeded by a second follower vehicle in the driving group, as may be detected by a signal sent from either the second follower vehicle to the first follower vehicle or the leader vehicle to the first follower vehicle, the first follower vehicle is caused to relay all driving information received from the leader vehicle. In some embodiments, a first follower vehicle may be further caused to transmit driving information of the local follower vehicle to a second follower vehicle, including any of the distance from the local follower vehicle to the leader vehicle, the velocity of the local follower vehicle, the steering position of the local follower vehicle, rate of acceleration of the local follower vehicle, rate deceleration of the local follower, and any other useful information. The second follower vehicle may base responses to received driving information on the conglomerated metrics from both sources, on metrics from only the leader vehicle, or on metrics from only the first follower vehicle. In some embodiments, receipt of driving information by additional follower vehicles may activate actuators in the additional follower vehicles in the same way as described previously.

Figure 4:
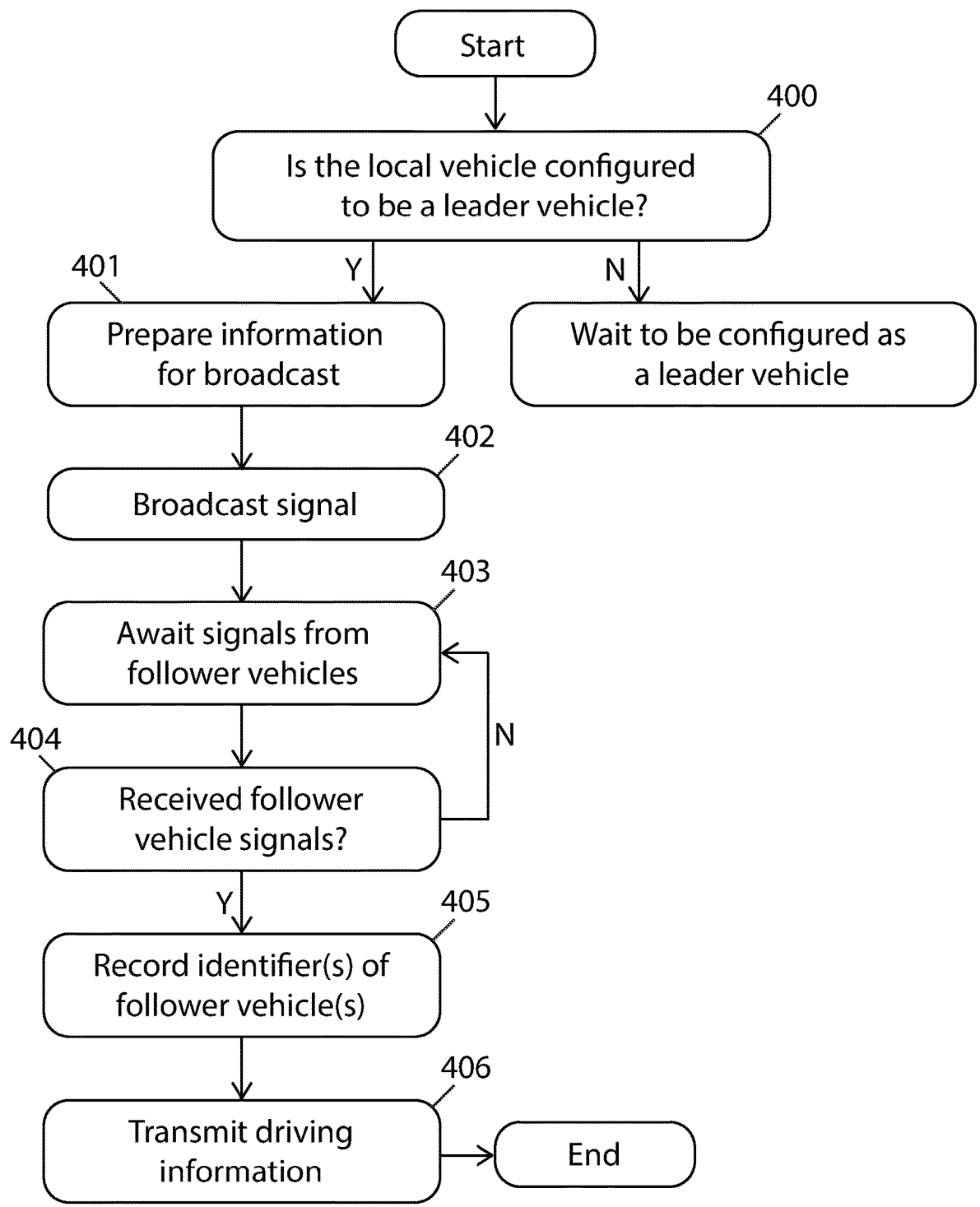
FIG. 4 illustrates an example of the process of initiating a driving group, according to some embodiments.

FIG. 4 illustrates an example of the process for establishing a new driving group. In a first step 400, a leader vehicle is identified. In a next step 401, the leader vehicle prepares information for broadcast, including the group's unique identifier, destination, and planned route. In a next step 402, the leader vehicle broadcasts signals with the prepared information. In a next step 403, the leader vehicle awaits incoming signals from potential follower vehicles. In some embodiments, if the leader vehicle receives any follower vehicle signals to join the group in a step 404, the process proceeds to a next step 405 in which the leader vehicle records a unique identifier of the one or more follower vehicles. In a next step 406, the leader vehicle starts transmitting driving information to the one or more follow vehicles.

In some embodiments, vehicles within a driving group exchange keepalive signals at predetermined intervals in order to assure the connection. If more than a predetermined number of keepalive signals are missed, the connection between the vehicles may be terminated.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:
1. A method for intelligent navigation of a leader vehicle leading a plurality of follower vehicles, comprising:
 determining, with a processor of the leader vehicle, at least real-time movement data to the plurality of follower vehicles;
 transmitting, with a signal emitter disposed on the leader vehicle, the at least real-time movement data to the plurality of follower vehicles;
 receiving, with a receiver disposed on each of the plurality of follower vehicles, the at least real-time movement data transmitted by the leader vehicle;
 detecting, with one or more sensors disposed on each of the plurality of follower vehicles, at least one maneuverability condition of the respective follower vehicle;
 measuring, with a distance measuring sensor disposed on each of the plurality of follower vehicles, a distance from the respective follower vehicle to another vehicle;
 processing, with a processor disposed on each of the plurality of follower vehicles, a vehicle maneuvering software application having a software instruction or code for controlling a movement or an operation of the respective follower vehicle;
 determining, with the processor disposed on each of the plurality of follower vehicles, a set of active maneuvering instructions for the respective follower vehicle based on at least a portion of the at least real-time movement data received from the leader vehicle;
 adjusting, with the processor disposed on each of the plurality of follower vehicles, at least a velocity and a steering position of each of the plurality of follower vehicles based on the at least real-time movement data received;
 actuating, with the processor disposed on each of the plurality of follower vehicles, the respective follower vehicle to execute the set of active maneuvering instructions based on at least a portion of the at least real-time movement data received from the leader vehicle;
 broadcasting, with the signal emitter disposed on the leader vehicle, a signal comprising a route of the leader vehicle and a location of the leader vehicle to potential follower vehicles; and
 determining, with a processor of a potential follower vehicle, to join a driving group led by the leader vehicle when a predetermined portion of a route of the potential follower vehicle matches the route of the leader vehicle and the potential follower vehicle shares a same final destination as the leader vehicle.

2. The method of claim 1, wherein the real-time movement data comprises at least a position, a heading, and a linear and angular speed of the leader vehicle.

3. The method of claim 1, wherein the software application is in communication with the respective at least the signal receiver, the respective one or more sensors, and the respective distance measuring sensor.

4. The method of claim 1, further comprising:
 determining, with the processor disposed on each of the plurality of follower vehicles a route for navigating the respective follower vehicle from an initial location; a preferred range of distances from a vehicle in front of the respective follower vehicle that the respective follower vehicle should stay within; and a lag in control commands.

5. The method of claim 1, wherein the leader vehicle and plurality of follower vehicles are configured to exchange keepalive signals at predetermined intervals.

6. The method of claim 1, wherein:
 the leader vehicle and the plurality of follower vehicles are connected through a physical medium comprising at least one of a wire and a mechanical attachment; and
 the physical medium permits connected vehicles to move with a degree of pivotal freedom relative to one another.

7. The method of claim 1, wherein the plurality of follower vehicles are further configured to transmit and receive signals from one another.

8. The method of claim 1, wherein determining the set of active maneuvering instructions comprises calculating a delay time between the leader vehicle and the respective follower vehicle.

9. The method of claim 8, wherein the delay time is equal to the distance between the respective follower vehicle and the leader vehicle divided by a velocity of the leader vehicle.

10. The method of claim 1, wherein the leader vehicle is further configured to transmit distance data comprising at least a distance between each of the plurality of follower vehicles and the leader vehicle to each of the plurality of follower vehicles.

11. A method for intelligent navigation of a guiding vehicle guiding a plurality of follower vehicles, comprising:
 determining, with a processor of the guiding vehicle, at least real-time navigation and maneuvering data for each of the plurality of follower vehicles;
 transmitting, with a signal emitter of the guiding vehicle, at least real-time navigation and maneuvering data to each of the plurality of follower vehicles;

receiving, with a signal receiver of the respective follower vehicle, the at least real-time navigation and maneuvering data for the respective follower vehicle;

adjusting, with a processor of the respective follower vehicle, at least a velocity and a steering position of the respective follower vehicle based on the at least real-time navigation and maneuvering data received;

broadcasting, with the signal emitter of the guiding vehicle, a signal comprising a route of the leader vehicle and a location of the leader vehicle to potential follower vehicles; and determining, with a processor of a potential follower vehicle, to join a driving group led by the guiding vehicle when a predetermined portion of a route of the potential follower vehicle matches the route of the guiding vehicle and the potential follower vehicle shares a same final destination as the guiding vehicle.

12. The method of claim 11, further comprising:

determining, with a distance sensor of the respective follower vehicle, the real-time distance to a vehicle in front of the respective follower vehicle;

transmitting, with a signal emitter of the respective follower vehicle, the real-time distance to the vehicle in front of the respective follower vehicle to the guiding vehicle;

receiving, with a receiver of the guiding vehicle, a real-time distance to a vehicle in front of each of the plurality of follower vehicles;

determining, with the processor of the guiding vehicle, a distance to each of the plurality of follower vehicles relative to the guiding vehicle, wherein the at least real-time navigation and maneuvering data for each of the plurality of follower vehicles is determined based on a real-time distance to the vehicle directly in front of each of the plurality of follower vehicles.

13. The method of claim 11, wherein the at least real-time navigation and maneuvering data comprises one or more of: velocity, steering position, acceleration, and heading.

14. The method of claim 11, wherein adjusting the velocity of the respective follower vehicle comprises increasing or decreasing the velocity of respective follower vehicle to equal a velocity provided in at least the real-time navigation and maneuvering data received.

15. The method of claim 11, wherein adjusting the steering position of the respective follower vehicle comprises, after a calculated delay time, turning a steering mechanism of the respective follower vehicle to equal the steering position provided in at least the real-time navigation and maneuvering data.

16. The method of claim 11, wherein determining the at least real-time navigation and maneuvering data for each of the plurality of follower vehicles comprises calculating a delay time between the guiding vehicle and each of the respective follower vehicles.

17. The method of claim 16, wherein the delay time is equal to the distance between the respective follower vehicle and the guiding vehicle divided by a velocity of the guiding vehicle.

18. The method of claim 11, wherein each of the plurality of follower vehicles are further configured to transmit and receive signals from one another.

19. The method of claim 11, wherein the guiding vehicle and each of the plurality of follower vehicles are further configured to exchange keepalive signals.

20. The method of claim 11, wherein one or more sensors of the guiding vehicle triggers an action in an actuator of each of the plurality of follower vehicles.

* * * * *